(No Model.)

M. DOELLE.
SEPARABLE BATH TUB.

No. 446,164. Patented Feb. 10, 1891.

WITNESSES:
A. Schehl.
John J. Powers

INVENTOR
Marie Doellé
BY Charles Kay
ATTORNEY.

UNITED STATES PATENT OFFICE.

MARIE DOELLÉ, OF NEW YORK, N. Y.

SEPARABLE BATH-TUB.

SPECIFICATION forming part of Letters Patent No. 446,164, dated February 10, 1891.

Application filed November 10, 1890. Serial No. 370,846. (No model.)

*To all whom it may concern:*

Be it known that I, MARIE DOELLÉ, a citizen of the United States, and a resident of New York, in the county of New York and State of New York, have invented certain new and useful Improvements in Separable Bathing-Tubs, of which the following is a specification.

My invention has reference to improvements in bathing-tubs; and the invention consists of a bathing-tub the walls and bottom of which are detachable, and of a lining of rubber or any other water-proof material, which lining is attached to the bathing-tub when the same is to be used and removed when the wall-sections and the bottom are to be separated to be stored away. I attain these objects by the construction illustrated in the accompanying drawings, in which—

Figure 1:
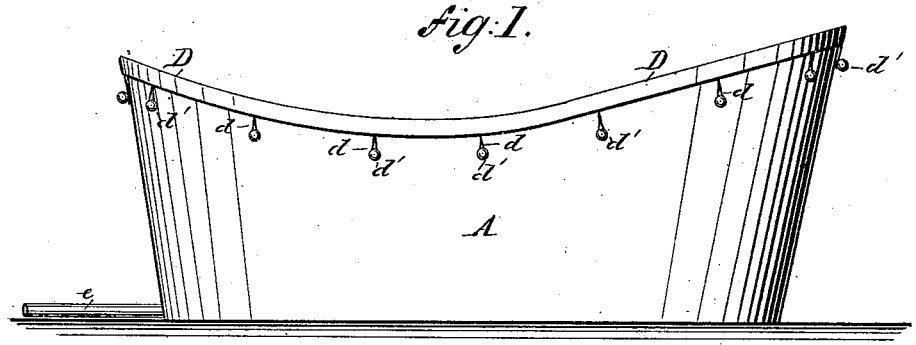
Figure 2:
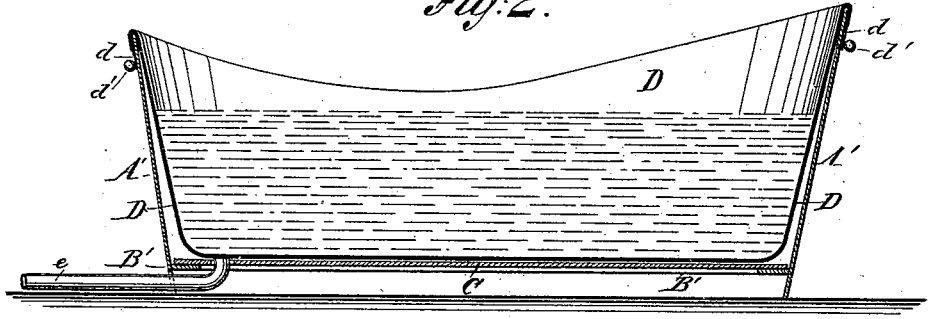
Figure 3:
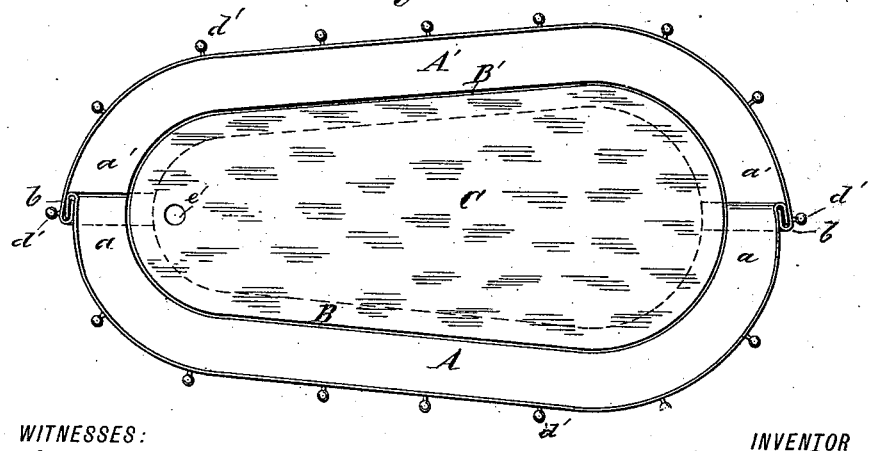

Figure 1 is a front view of my separable bathing-tub; Fig. 2, a longitudinal section, and Fig. 3 a top view of the same.

Similar letters of reference indicate corresponding parts.

A A' in the drawings are two sections of my separable bathing-tub, preferably made of sheet metal, which sections are so shaped as to form the side walls of the tub. The inwardly-bent portions $a$ $a$ and $a'$ $a'$ of the wall-sections A and A' form, respectively, the head and foot ends of the bathing-tub when the said portions are put together by means of lap-seams $b$, as clearly shown in Fig. 3. Instead of the lap-seams, any other joints may be used—for instance, screws and nuts or cramps and bolts—to unite the edges of the inwardly-bent portions of the sections A A' with each other. If desired, these main sections A A' may be divided into a number of smaller sections, which are united in the same manner. The wall-sections A A' are, near their lower edge, provided with inwardly-extending flanges B B'.

C is a bottom plate of sheet metal or wood, which may consist of one piece or several sections, as desired. When the wall-sections are put together, the bottom plate C is placed on the flanges B B' of the said sections.

Of course the joints of the several parts by which the bathing-tub is formed are not tight enough to prevent the leakage of the water. To overcome this disadvantage I use a detachable lining D, of rubber or any other water-proof material, which, when spread over the interior of the tub, covers the bottom and the inner sides of the tub. To the edge of the said lining loops $d$ are attached, which loops are fastened to hooks or knobs $d'$ on the outside of the wall-sections A A', so that the lining is reliably attached to the tub and the leakage of the water is entirely prevented when the tub is filled. Instead of the loops and hooks or knobs any other means for fastening the lining to the wall-sections may be used.

For the purpose of letting off the water the rubber lining is provided with a discharge-hose $e$, having a suitable locking device, which hose passes through a corresponding opening $e'$ in the bottom or one of the side walls of the bathing-tub.

When my improved bathing-tub is to be used, the several parts of the same are put together, as described, and when after use the water is let off, the rubber lining is released from the side walls and removed from the tub, the bottom is then taken away, and the wall-sections detached from each other.

My improved separable bathing-tub has the advantage that it can be easily put together, and that the parts of the same, when stored away, occupy only a comparatively small room, whereby the bathing-tub is rendered very useful for sick-rooms, hospitals, and residences consisting of small compartments.

Having thus described my invention, I claim as new and desire to secure by Letters Patent—

1. A separable bathing-tub consisting of detachable wall-sections having devices by which the meeting edges of the same are connected with each other and inwardly-extending flanges near their lower edges, and a detachable bottom plate supported by the said flanges of the wall-sections, substantially as set forth.

2. A separable bathing-tub consisting of detachable wall-sections with inwardly-extending flanges near their lower edges, and a detachable bottom plate supported by said flanges of the wall-sections, in combination with a detachable lining of rubber or other water-proof material having means by which the same is fastened to the upper edges of the wall-sections, substantially as set forth.

Signed at New York, in the county of New York and State of New York, this 2d day of September, A. D. 1890.

MARIE DOELLE.

Witnesses:
CHARLES KARP,
JOHN J. POWERS.